US008266247B2

(12) United States Patent
Yamashita et al.

(10) Patent No.: US 8,266,247 B2
(45) Date of Patent: Sep. 11, 2012

(54) RELAY PROCESSING APPARATUS, CONTROL METHOD AND PROGRAM THEREFOR, AND TERMINAL CONTROL SERVER

(75) Inventors: Yuhji Yamashita, Yamato (JP); Hirobumi Toyshima, Machida (JP); Yasuhide Niimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 3111 days.

(21) Appl. No.: 10/673,812

(22) Filed: Sep. 29, 2003

(65) Prior Publication Data

US 2004/0153501 A1 Aug. 5, 2004

(30) Foreign Application Priority Data

Dec. 16, 2002 (JP) .................................. 2002-363886

(51) Int. Cl.
*G06F 15/16* (2006.01)
(52) U.S. Cl. ...................................................... 709/218
(58) Field of Classification Search .................. 709/218, 709/203
See application file for complete search history.

(56) References Cited

U.S. PATENT DOCUMENTS

| 6,510,523 | B1 * | 1/2003 | Perlman et al. .................... 726/6 |
| 6,598,167 | B2 * | 7/2003 | Devine et al. ..................... 726/8 |
| 6,728,769 | B1 * | 4/2004 | Hoffmann .................... 709/225 |
| 2002/0138761 | A1 * | 9/2002 | Kanemaki et al. ............ 713/201 |
| 2004/0107282 | A1 * | 6/2004 | Chakraborty et al. ........ 709/229 |

FOREIGN PATENT DOCUMENTS

| JP | 2002-358280 | 13/2002 |
| JP | 2000-267960 | 9/2000 |
| JP | 2001-243344 | 9/2001 |
| WO | WO 9745798 | 12/1997 |

OTHER PUBLICATIONS

"e-business Cookbook for z/OS vol. I: Technology Introduction", Vilaghy et al., IBM Redbooks series, Jul. 2002.*
'e-Business Cookbook for z/OS vol. I: Technology Introduction', Vilaghy et al., IBM Redbooks, Jul. 2002.*

* cited by examiner

*Primary Examiner* — Jerry Dennison
(74) *Attorney, Agent, or Firm* — Steven M. Greenberg, Esq.; Carey, Rodriguez, Greenberg & O'Keefe

(57) ABSTRACT

A relay processing apparatus for relaying communications between a process for a control program that generates control commands for a terminal and a process for an HTTP server program that returns, to the terminal, a command constituting an HTTP response to a HTTP request received from the terminal, comprises: a terminal request processor for initiating the process performed by the control program upon the reception of a function call from the HTTP server program that initially received the HTTP request; and a control request processor for receiving from the control program a command corresponding to a function call, and for transmitting to the terminal request processor a notification that the command has been received, wherein, when the reception notification is received, the terminal request processor is permitted to return the processing to the HTTP server program, and the HTTP server program is permitted to return the command included in the HTTP response issued for the HTTP request.

9 Claims, 6 Drawing Sheets

RELAY PROCESSING APPARATUS, CONTROL METHOD AND PROGRAM THEREFOR, AND TERMINAL CONTROL SERVER

FIELD OF THE INVENTION

The present invention relates to a relay processing apparatus, a control method and a program therefor, a recording medium for this program, and a terminal control server. In particular, the present invention relates to a relay processing apparatus that controls a terminal across a network, a control method and a program therefor, a recording medium for this program, and a terminal control server.

BACKGROUND

A proposed gateway program serves as a communication relay between a web server program, which exchanges HTTP requests/HTTP responses with a terminal, and an application program, which performs processing consonant with HTTP requests. For background, see Japanese Unexamined Patent Application No. Hei 11-510632. With this gateway program, an HTTP request can be converted, as needed, and supplied to an application program that cannot interpret HTML documents, thereby enabling the application program to perform an appropriate process.

However, the proposed gateway program presents a problem.

For information exchange, an HTTP server, a web server program, a gateway program and an application program employ inter-thread communication. In this case, while taking thread synchronization into account, a complicated operation is required of a program creator.

To resolve the above shortcoming, it is one objective of the present invention to provide a relay processing apparatus; a control method and a program therefor, and a recording medium for the program; and a terminal control server. To reach this objective, a combination of the characteristics presented in the independent claims of this invention are applied, while further, advantageous examples are defined in the dependent claims.

SUMMARY OF THE INVENTION

According to one aspect of the invention, a relay processing apparatus (200) for relaying communications between a process for a control program (250) that generates control commands for a terminal (100) and a process for an HTTP server program (210) that returns, to the terminal, a command constituting an HTTP response to a HTTP request received from the terminal, comprises:
a terminal request processor (220) for initiating the process performed by the control program upon the reception of a function call from the HTTP server program that initially received the HTTP request; and
a control request processor (230) for receiving from the control program a command corresponding to a function call, and for transmitting to the terminal request processor a notification that the command has been received,
wherein, when the reception notification is received, the terminal request processor is permitted to return the processing to the HTTP server program, and the HTTP server program is permitted to return the command included in the HTTP response issued for the HTTP request. Also provided are a control method for controlling the relay processing apparatus, a program that implements the processing by the relay processing apparatus and a recording medium for storing the program, and a terminal process server that includes the relay processing apparatus.

It should be noted that the overview of the invention does not represent all the characteristics required for the invention, and a sub-combination of these characteristics can be provided as the invention.

DETAILED DESCRIPTION

The preferred embodiment of the invention will now be described. It should be noted, however, that this embodiment does not limit the invention to the following claims, and that not all the combinations of the characteristics explained in this embodiment are always required to constitute means for the resolution of the present invention.

Figure 1:
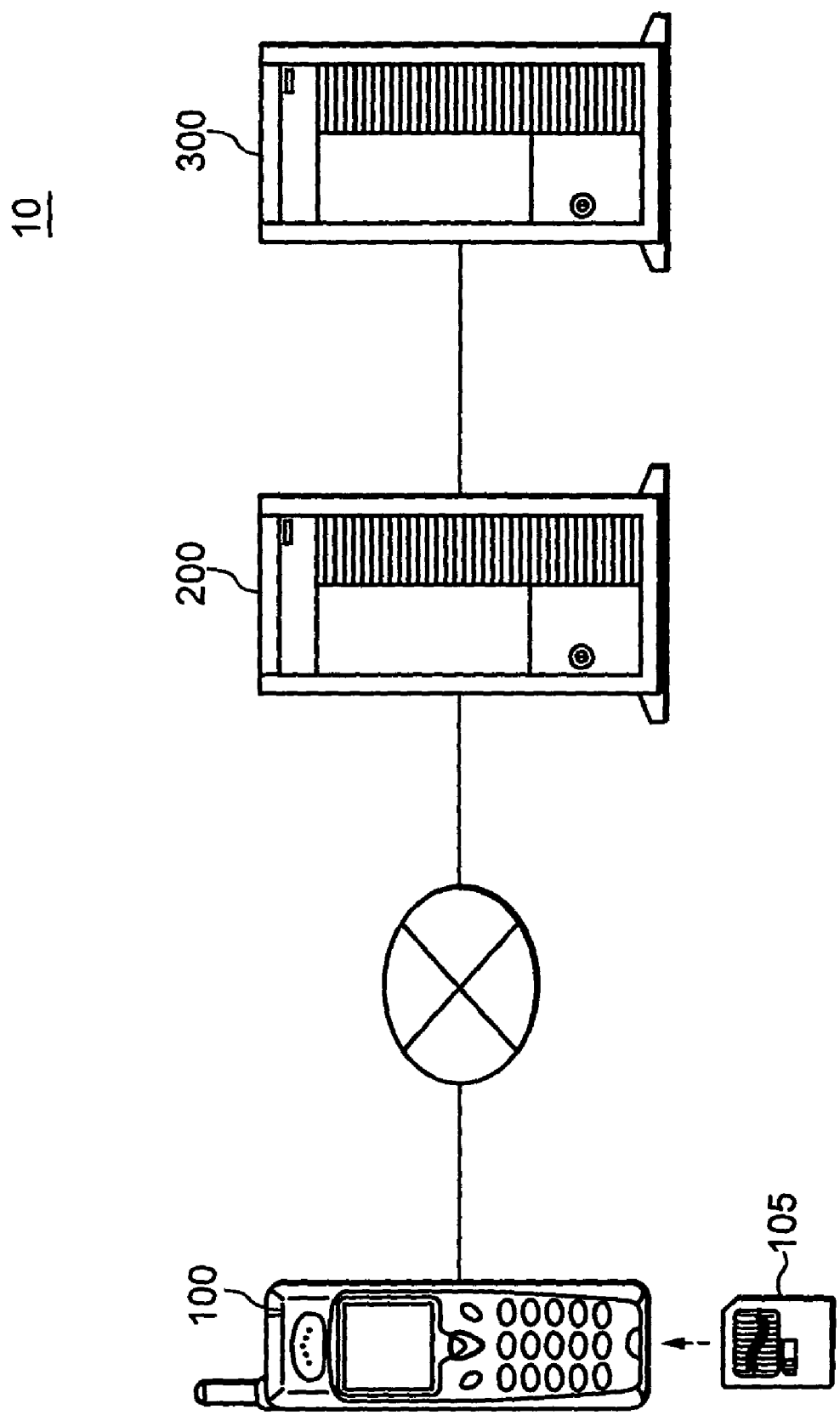
FIG. 1 is a schematic diagram showing a communication system 10.

FIG. 1 is a schematic diagram showing a communication system 10. The communication system 10 comprises: a terminal 100, such as a portable communication terminal; a terminal control server 200, which communicates with the terminal 100 via a network; and a certificate authority 300, which authenticates the terminal 100 in accordance with a request received from the terminal control server 200. The terminal 100 transmits an electronic certification request message to the terminal control server 200 to request the preparation of an electronic certificate. Upon the reception of this message, the terminal control server 200 transmits a terminal control command to the terminal 100, and permits the terminal 100 to transmit, to the terminal control server, information required for the preparation of an electronic certificate. For example, the terminal control server 200 permits the terminal 100 to prepare an electronic signature using a secret key, of public key encryption type, that is recorded on an IC card 105. Then, the terminal control server 200 employs the certificate authority 300 to authenticate the terminal 100, and obtains the electronic certificate and transmits it to the terminal 100. This is very convenient for a user of the terminal 100, because to transmit a certification request message to the terminal control server 200, the user need only issue an instruction that permits the terminal control server 200 to assume control of the terminal 100.

Figure 2:
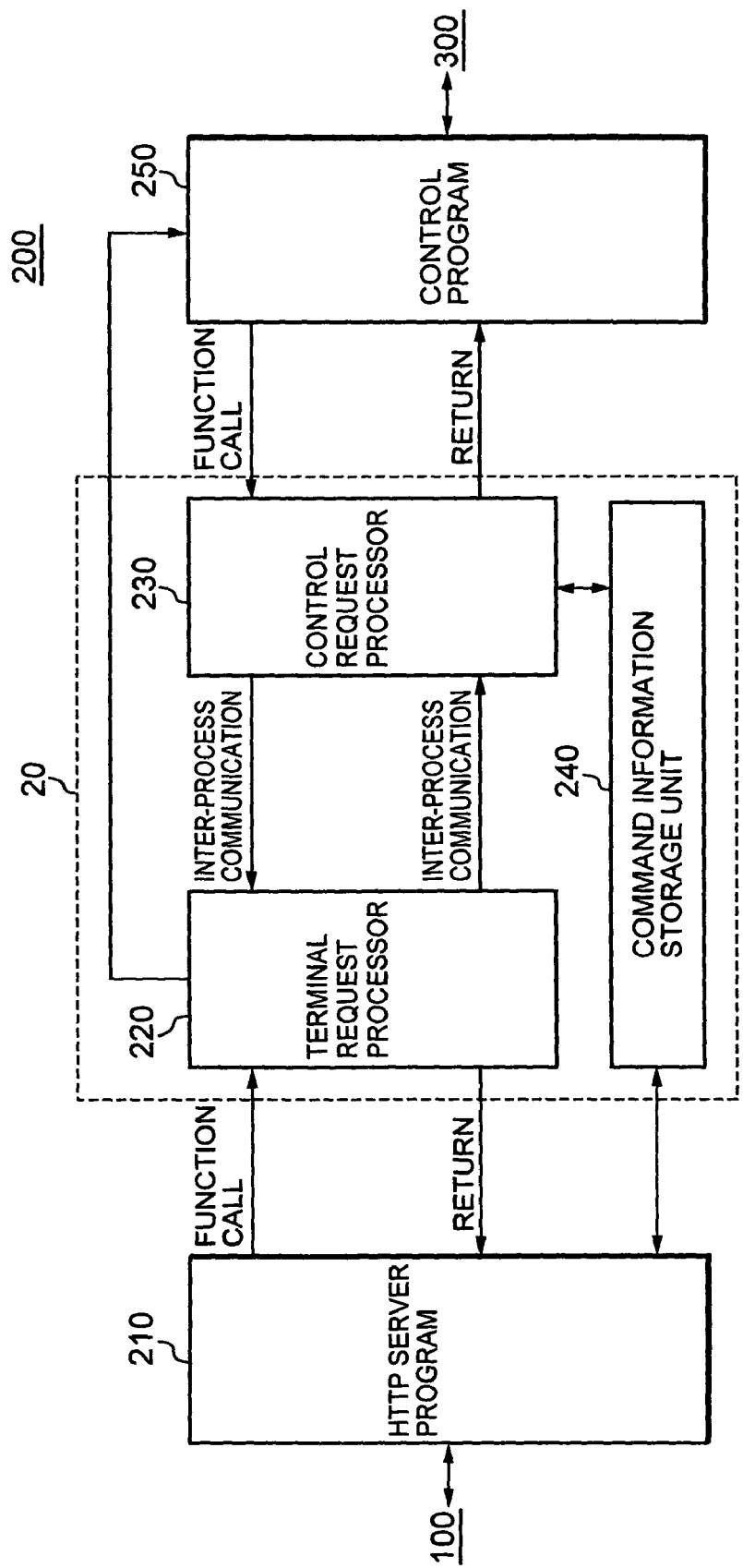
FIG. 2 is a functional block diagram showing a terminal control server 200.

FIG. 2 is a functional block diagram showing the terminal control server 200. The terminal control server 200 comprises: an HTTP server program 210, a relay processing apparatus 20 and a control program 250. The control program 250 generates a command for controlling the terminal 100, and the HTTP server program 210 returns this command as an HTTP response for the HTTP request received from the terminal 100. The relay processing apparatus 20 respectively receives function calls from the HTTP server program 210 and the control program 250, and relays communications between the HTTP server program 210 and the control program 250. For example, the control program 250 calls a function that implements the processing by the relay processing apparatus 20, and permits the relay processing apparatus 20 to transmit a command to the terminal 100. When the process is returned from the function, the control program 250 receives a response for the above command, and performs the processing using the certificate authority 300. That is, since the control program 250 calls the function that implements the processing by the relay processing apparatus 20, the control program 250 can control the terminal 100 without performing a clear communication process, such as an inter-process communication. As a result, not only can the creator of the program prepare the control program 250, albeit inconveniently, but also the productivity, the reliability and the reusability of the program can be improved.

The relay processing apparatus 20 comprises: a terminal request processor 220, a control request processor 230 and a command information storage unit 240. The terminal request processor 220 receives a function call from the HTTP server program 210, which has received the HTTP request, and initiates the process performed by the control program 250. For example, when the terminal request processor 220 receives a first HTTP request following to the initialization of the HTTP server program 210, the terminal request processor 220 generates and starts the process for the control program 250. The process, in this instance, is substantially the execution of the program that is managed by the operating system, and can be either a thread or a task. Further, the function call represents a sub-routine call in the C language. However, the function call may be either a method call issued in the JAVA (a registered trademark) language, or a procedure call issued in another programming language.

When the terminal request processor 220 receives, from the control side request processor 230, a reception notification indicating that the control request processor 230 has received a command from the control program 250, the terminal request processor 220 returns the process to the HTTP server program 210. The process for returning the process is, for example, the same process as is used for returning from the function call. As a result, the terminal request processor 220 can transmit the command to the HTTP server program 210, while the command is included in the HTTP response for the HTTP request received from the HTTP server program.

The control request processor 230 receives the command in accordance with the function call from the control program 250, and stores the received command in the command information storage unit 240. Then, the control request processor 230 transmits to the terminal request processor 220, using the inter-process communication, for example, a reception notification indicating that the command was received. Thereafter, the command information storage unit 240 stores the HTTP request that was transmitted to the control request processor 230 by the HTTP server program 210, and the command that was transmitted to the HTTP server program 210 by the control request processor 230.

Figure 3:
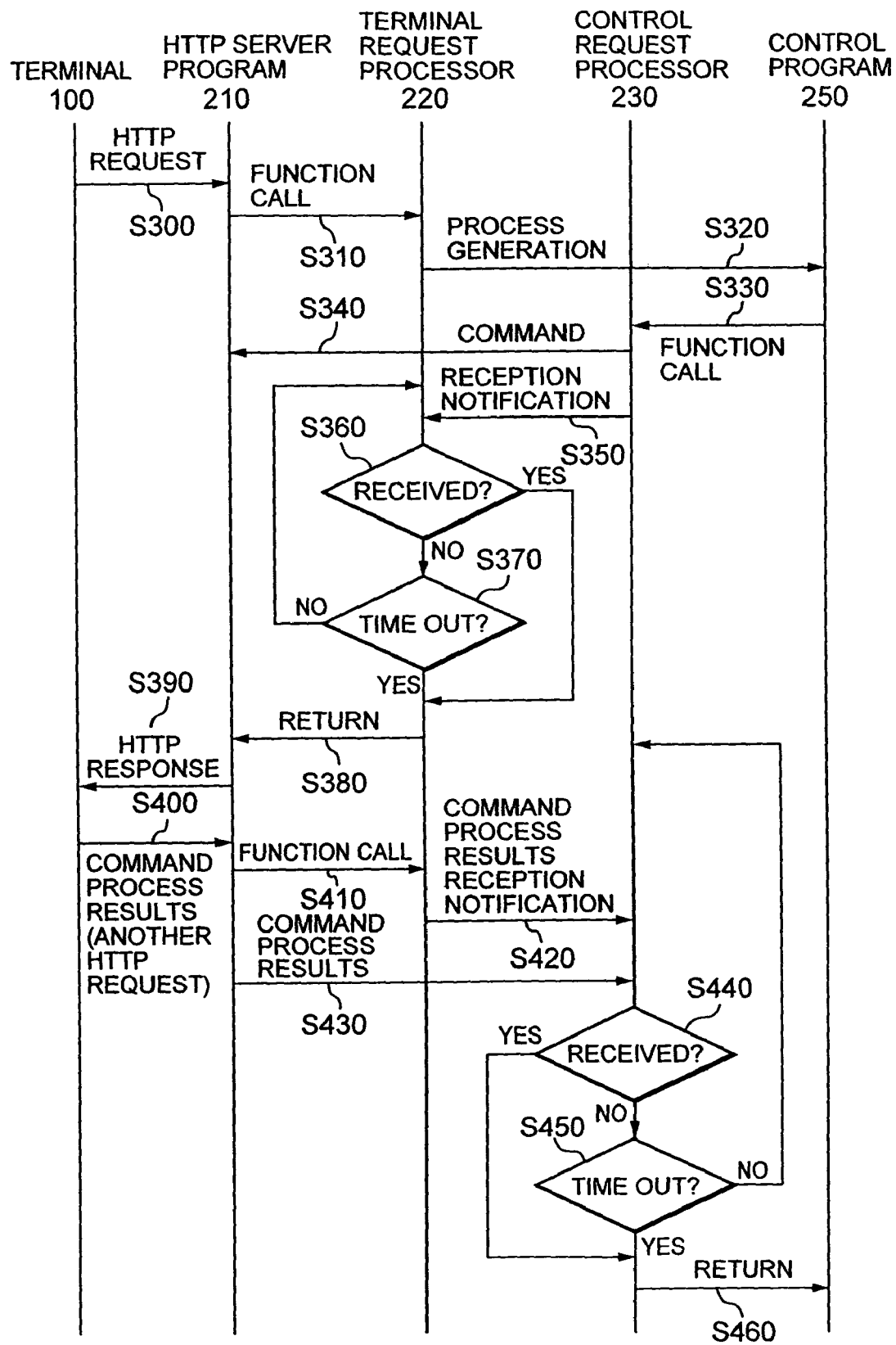
FIG. 3 is a diagram showing example communication processing performed by the terminal control server 200.

FIG. 3 is a diagram showing example communication processing performed by the terminal control server 200. The terminal 100 transmits an HTTP request to the HTTP server program 210 (S300). Then, upon receiving this HTTP request, the HTTP server program 210 calls a function that implements the processing by the terminal request processor 220 (S310). At this time, the HTTP server program 210 may receive, in correlation with the HTTP request, terminal identification information for identifying the type of terminal 100 that transmitted the HTTP request. Upon receiving the function call from the HTTP server program 210, the terminal request processor 220 generates and initiates the process for the control program 250 (S320). After the process for the control program 250 has been initiated, the terminal request processor 220 is shifted to the halted state, while the execution state is maintained. Here, the halted state is a wait state wherein the use of a CPU, a memory and an input/output device are halted while the values of a program counter, a stack pointer and a register are maintained.

The control program 250 generates a command for controlling the terminal 100, calls a function that implements the processing by the control request processor 230, and transmits a function call argument as a command, for example, to the control request processor 230 (S330). Upon receiving this command, the control request processor 230 transmits a command to the HTTP server program 210 (S340). For example, the control request processor 230 stores the command in the command information storage unit 240, so that the HTTP server program that resumes the operation can obtain the command later. At this time, based on the terminal identification information, the control request processor 230 may convert the command into a message acceptable by the terminal 100 at the command transmission destination. Thereafter, the control request processor 230 transmits to the terminal request processor 220 a reception notification that the command has been received (S350), and is shifted to the halted state while the execution state is maintained.

When the terminal request processor 220 receives the reception notification from the control request processor 230 (YES at S360), the terminal request controller 220 is recovered from the halted state, and returns to the HTTP server program process (S380) the processing from the function call. In accordance with the return of this function call, the HTTP server program 210 obtains the command from the command information storage unit 240, and transmits this command, together with the HTTP response to the terminal 100 (S390). When the terminal request processor 220 does not receive the reception notification (NO at S360), the terminal request processor 220 determines whether the time-out state has been established, i.e., whether the reception notification has been received within a period of time during which it has been determined, in advance, whether the process for the control program 250 has been initiated (S370). When the time-out state has not been established (NO at S370), the terminal request processor 220 returns the processing to S360. When the time-out state has been established (YES at S370), the terminal request processor 220 is recovered from the halted state and returned to the processing for the HTTP server program 210. Upon receiving this return, the HTTP server program 210 transmits to the terminal 100 an HTTP response indicating that the generation of a command has failed (S390).

The terminal 100 performs processing corresponding to the command included in the HTTP response, and transmits to the HTTP server program 210 another HTTP request, which includes the command process results (S400). Upon receiving the HTTP request, the HTTP server program 210 stores the command process results in the command information storage unit 240, and calls a function that implements the processing by the terminal request processor 220 (S410). The terminal request processor 220 receives the function call from the HTTP server program 210, and transmits to the control request processor 230 a command process result reception notification, which indicates that the HTTP server program 210 has received the HTTP request, including the command process results (S420). Then, the terminal request processor 220 acts to recover the control request processor 230 from the halted state, and permits the control request processor 230 to resume the process for the control program 250.

When the HTTP server program 210 receives the HTTP request, which includes the command process results (YES at S440), the control request processor 230 is recovered from the halted state and obtains the command process results from the command information storage unit 240 (S430). The control request processor 230 then returns the process to the control program 250, and permits the control program 250 to perform processing corresponding to the command process results (S460). When the HTTP server program 210 does not receive the HTTP request (NO at S440), the control request processor 230 determines whether the time-out state has been established, i.e. whether a command process results reception notification has not been received within a period of time determined in advance, since the reception notification was transmitted to the terminal request processor 220 (S450). When the time-out state has not been established (NO at S450), the control request processor 230 returns the processing to S440. But when the time-out state has been established (YES at S450), the control request processor 230 is returned from the function call issued by the control program 250, and transmits to the control program 250, for example, a return value for the function call, which is information indicating that the command process results can not be received (S460).

Figure 4:
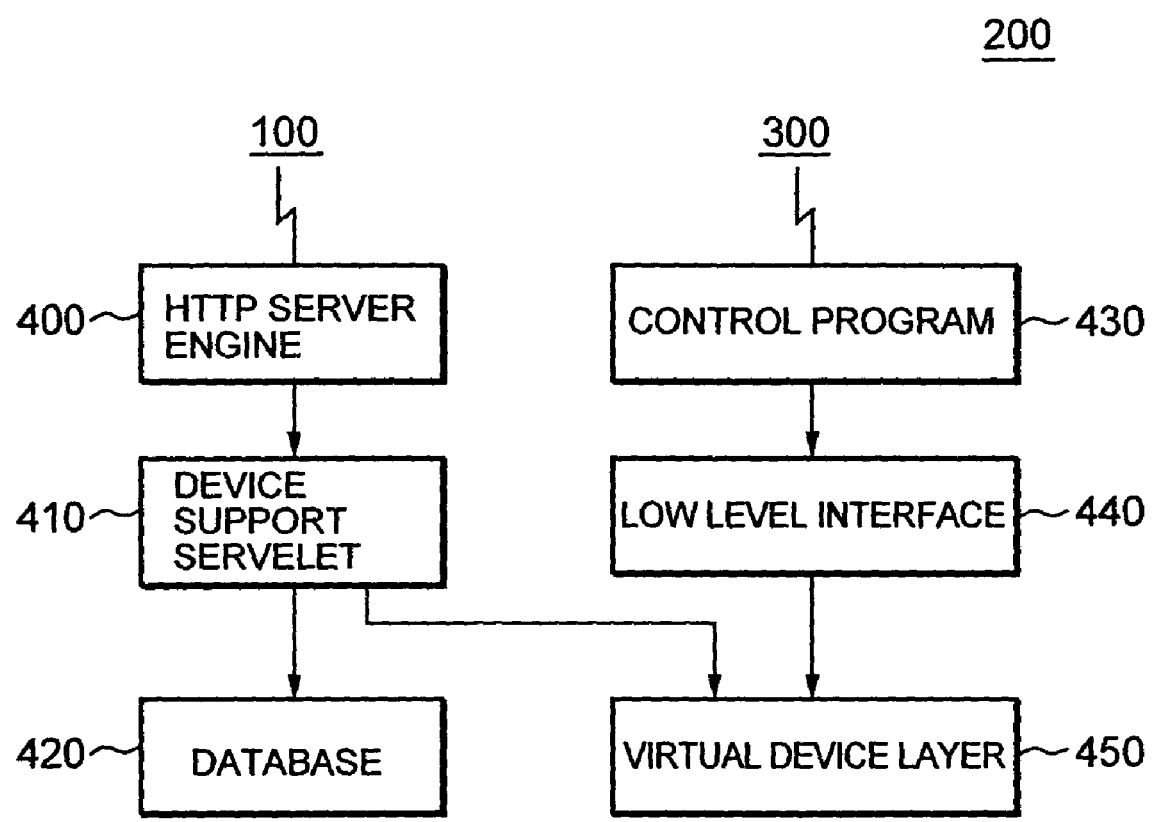
FIG. 4 is a diagram showing example software components for the terminal control server 200.

FIG. 4 is a diagram showing example software components for the terminal control server 200. The terminal control server 200 comprises, as software components, an HTTP server engine 400 that implements the HTTP server program 210, a device support servlet 410, a database 420, a control program 430 that implements the control program 250, a low level interface 440, and a virtual device layer 450 that implements the processing by the relay processing apparatus 20. Arrows in FIG. 4 indicate function calls. That is, a function call is issued at a starting point and transmitted along an arrow leading to a terminal point, and a function return is issued at the terminal point indicated by the arrow and transmitted to the starting point.

More specifically, the HTTP server engine 400 receives an HTTP request from the terminal 100 and calls a function that implements the processing by the device support servlet 410, and the device support servlet 410 then calls a function that employs the database 420 or implements the control program 430. The control program 430 employs the certificate authority 300, as needed, to call a function that implements processing by the low level interface 440, and generates a command. Thereafter, the low level interface 440 calls a function that implements the processing by the virtual device layer 450, which, upon receiving function calls from the device support servlet 410 and the low level interface 440, relays communications between the HTTP server engine 400 and the control program 430.

As is described above, a function call is included wherein multiple function calls are nested. That is, the terminal request processor 220 of the relay processing apparatus may receive a function call from the HTTP server program 210 through another sub-routine, such as the device support servlet 410. Similarly, the control request processor 230 of the relay processing apparatus 20 may receive a function call from the control program 250 through another sub-routine, such as the low level interface 440. In this case, the return transmitted by the function also includes a return transmitted through another sub-routine.

Figure 5:
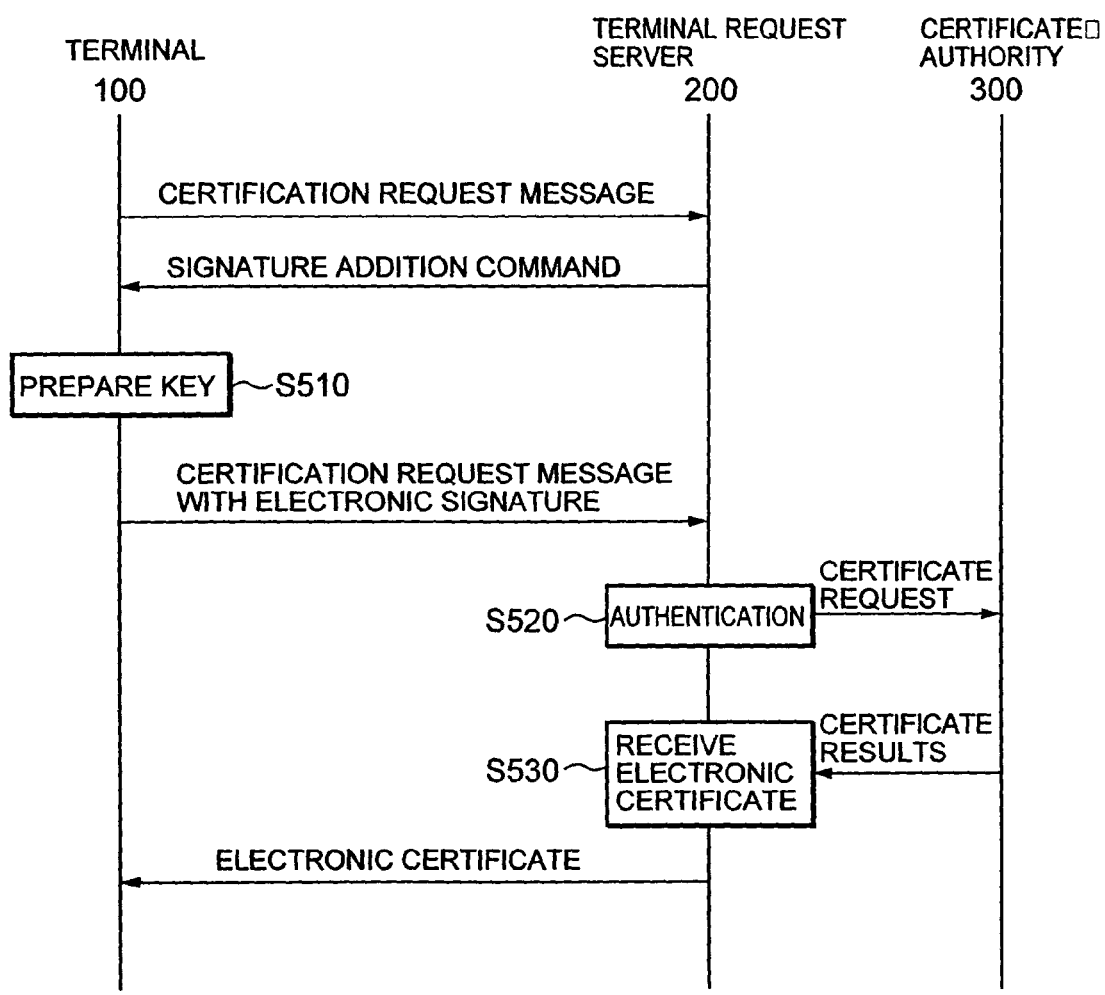
FIG. 5 is a diagram showing example communication processing employed when an electronic certificate is issued to a terminal 100.

FIG. 5 is a diagram showing example communication processing for issuing an electronic certificate to the terminal 100. The terminal 100 transmits to the terminal control server 200 a first HTTP request, which is a certification request message for requesting the preparation of an electronic certificate that authenticates the terminal 100. The operation performed by the terminal control server 200, in this case, will now be described in detail. When the HTTP server program 210 has received the first HTTP request, the terminal request processor 220 receives a function call from the HTTP server program 210, and initiates the process for the control program 250 that prepares the electronic certificate.

In accordance with the function call transmitted by the control program 250, the control request processor 230 receives a signature addition command to transmit to the terminal 100, after a certification request message with an electronic signature has been added, and transmits a reception notification to the terminal request processor 220. Upon receiving the reception notification, the terminal request processor 220 obtains the signature addition command from the command information storage unit 240, and transmits this command to the terminal 100. The terminal 100 transmits, to the terminal control server 200, a second HTTP request, a certification request message, in response to the certification addition command, with an added electronic signature. The terminal 100 prepares, for example, a secret key and a public key of a public key encryption type (S510), and uses the secret key to add an electronic signature to the certification request message.

The terminal request processor 200 receives the function call from the HTTP server program 210 that received the second HTTP request, and transmits a function call notification to the control request processor 230. Upon receiving this notification, the control request processor 230 obtains from the command information storage unit 240 the certification request message to which the electronic signature has been added, and returns the processing to the control program 230 for the transmission, to the control program 250, of the certification request message to which the electronic signature has been added. When the control request processor 230 does not receive the certification request message and the added electronic signature within a specified, predetermined period of time following the transmission of the reception notification to the terminal request processor 220, the control request processor 230 transmits a message to this effect to the control program 250.

The terminal request processor 220 then permits the control program to prepare the electronic certificate and return this certificate as an HTTP response to a third HTTP request. That is, the control program 250 transmits the certification request message, to which the electronic signature has been added, to the externally provided certificate authority 300, which is permitted to prepare the electronic certificate (S520). The control program 250 then receives the electronic certificate from the certificate authority 300 (S530), and calls the function that implements the processing by the control request processor 230. Upon receiving the function call, the control request processor 230 stores the electronic certificate in the command information storage unit 240 and transmits the reception notification to the terminal request processor 220. When this reception notification is received, the terminal request processor 220 transmits the electronic certificate to the terminal 100 as an HTTP response to the third HTTP request. And when the terminal request processor 220 does not receive a reception notification within a specified period of time, which has been determined in advance, following the reception of the function call from the HTTP server program 210 to which the second HTTP request was forwarded, the terminal request processor 220 transmits a message to this effect to the HTTP response.

As is described above, either when an obstruction occurs during the communication with the certificate authority 300, when the certificate authority 300 is too busy to perform the processing, or when, for some reason, communication with the terminal 100 and the terminal control server 200 is obstructed, the communication system 100 can appropriately halt the communication process and prevent the communication system 100 from becoming congested.

Figure 6:
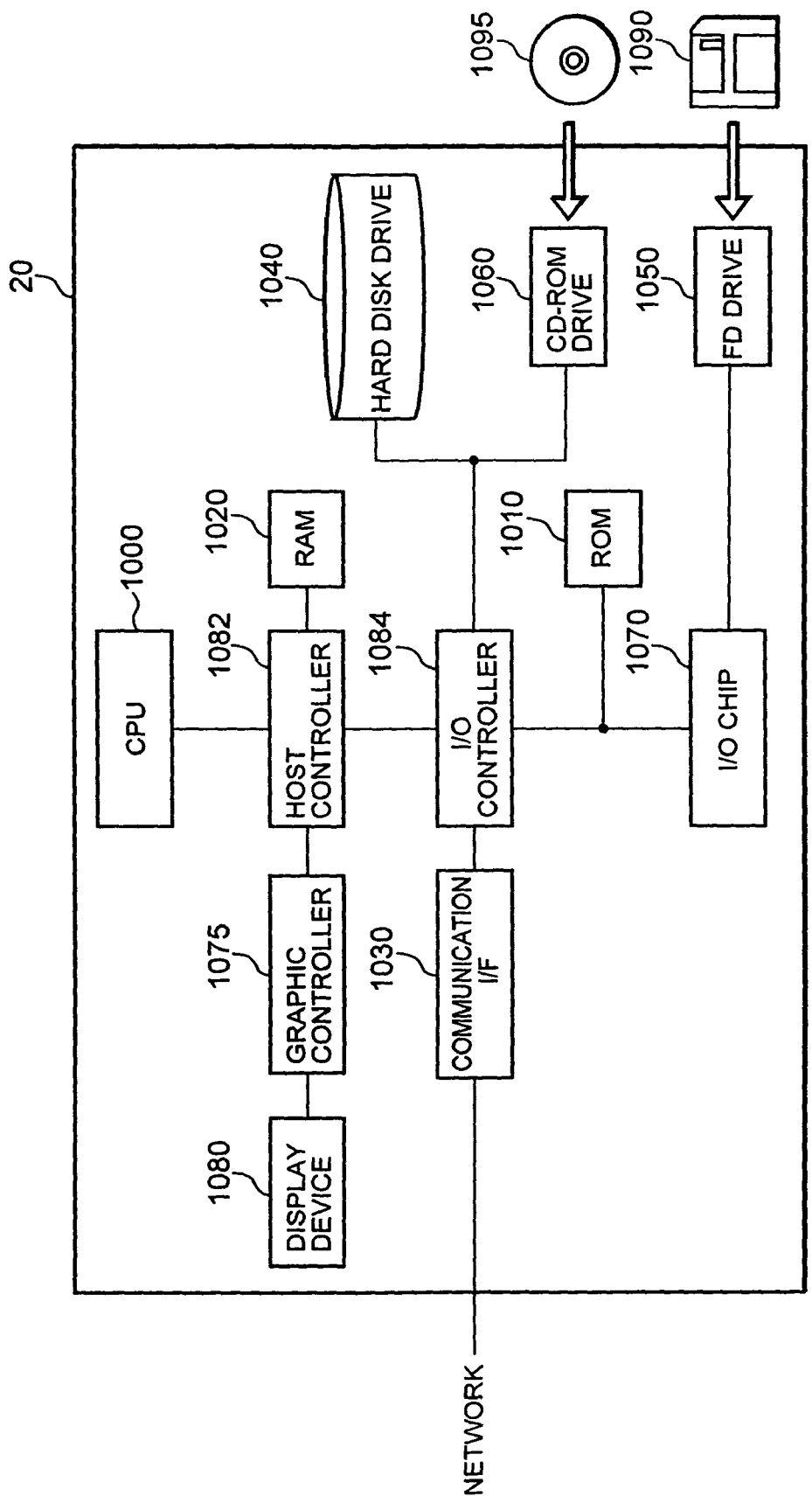
FIG. 6 is a diagram showing an example hardware configuration for a relay processing apparatus 20.

FIG. 6 is a diagram showing an example hardware configuration for the relay processing apparatus 20. The relay processing apparatus in this embodiment comprises: a CPU peripheral section, which includes a CPU 1000, a RAM 1020, a graphic controller 1075 and a display device 1080 that are interconnected by a host controller 1082; an input/output section, which includes a communication interface 1030, a hard disk drive 1040 and a CD-ROM drive 1060 that are connected to the host controller 1082 by an input/output controller 1084; and a legacy input/output section, which includes a ROM 1010, a flexible disk drive 1050 and an input/output chip 1070 that are connected to the input/output controller 1084.

The host controller 1082 connects the RAM 1020 to the CPU 1000, which accesses the RAM 1020 at a high transfer rate, and the graphic controller 1075. The CPU 1000, the operation of which is based on programs stored in the ROM 1010 and the RAM 1020, controls the individual sections. The graphic controller 1075 obtains, from a frame buffer provided in the RAM 1020, image data generated by the CPU 1000 that it displays on the display device 1080. The graphic controller 1075 may also have an internally provided frame buffer wherein image data generated by the CPU 1000 are stored.

The input/output controller 1084 couples the host controller 1082 with the communication interface 1030, the hard disk drive 1040, the CD-ROM 1060 and the input/output chip 1070, which are comparatively fast input/output devices. The communication interface 1030 communicates with another apparatus via a network; the hard disk drive 1040 stores programs and data used by the relay processing apparatus 20; and the CD-ROM drive 1060 reads either a program or data from a CD-ROM 1095 that it transmits to the RAM 1020 via the input/output controller 1084.

Further, the ROM 1010 and comparatively slow input/output devices, such as the flexible disk drive 1050 and the input/output chip 1070, are connected to the input/output controller 1084. The ROM 1010 is used to store a boot program that the CPU 1000 executes upon the activation of the relay processing apparatus 20 and a program that depends on the hardware of the relay processing apparatus 20.

The flexible disk drive 1050 reads a program or data from a flexible disk 1090 that it transmits to the RAM 1020 via the input/output controller 1084. And the input/output chip 1070 is connected to the flexible disk 1090 and various input/output devices via, for example, a parallel port, a serial port, a keyboard port and a mouse port.

The program that is installed in and executed by the relay processing apparatus 20 includes a terminal request process module, a control request process module and a command information storage module. Since the operations that these modules perform are the same as those performed by corresponding members in the relay processing apparatus 20, explained while referring to FIGS. 1 to 4, no further explanation for them will be given.

As is apparent from the above description, according to the relay processing apparatus 20 in this embodiment, since the control program 250 calls a function that implements the processing by the relay processing apparatus 230, the control program 250 can control the terminal 100 without performing a specific communication process, such as inter-process communication. Therefore, not only can the creator of the program conveniently create the control program 250, but also the productivity, the reliability and the reusability of the program can be improved.

Further, when the relay processing apparatus 20 does not receive a command response from the terminal 100 within a predetermined period of time, the relay processing apparatus 20 can forward a notification to that effect to the control program 250. Further, when the relay processing apparatus 20 does not receive from the control program 250 an HTTP response for the HTTP request within a predetermined period of time, the relay processing apparatus 20 can appropriately notify the terminal 100 to that effect.

Therefore, when the environment for communication between the terminal 100 and the terminal control sever 200 is poor, a proper error process can be performed and the robustness of the communication system 10 can be improved.

The present invention has been described by referring to the embodiment; however, the technical scope of the invention is not limited to the range of the description provided for the embodiment. Furthermore, various modifications and improvements can be added to the above embodiment, and from the claims included for the invention, it is apparent that these modifications and improvements can also be included in the technical scope of the invention.

According to the above described embodiment, a relay processing apparatus, a control method and a program therefor, a recording medium for this program, and a terminal control server are provided as follows.

(Entry 1) A relay processing apparatus for relaying communications between a process for a control program that generates control commands for a terminal and a process for an HTTP server program that returns, to the terminal, a command constituting an HTTP response to a HTTP request received from the terminal, comprising:
  a terminal request processor for initiating the process performed by the control program upon the reception of a function call from the HTTP server program that initially received the HTTP request; and
  a control request processor for receiving from the control program a command corresponding to a function call, and for transmitting to the terminal request processor a notification that the command has been received,
  wherein, when the reception notification is received, the terminal request processor is permitted to return the processing to the HTTP server program, and the HTTP server program is permitted to return the command included in the HTTP response issued for the HTTP request.

(Entry 2) A relay processing apparatus according to entry 1, wherein, when the HTTP server program receives another HTTP request that includes command processing results for the command, the control request processor returns processing control to the control program, and permits the control program to perform a process corresponding to the command processing results.

(Entry 3) A relay processing apparatus according to entry 1, wherein the terminal request processor receives a function call from the HTTP server program and initiates a process for the control program, and is thereafter shifted to a halted state while maintaining an execution state; and wherein, upon receiving the reception notification from the control request processor, the terminal request processor is recovered from the halted state and returns the processing control to the HTTP server program.

(Entry 4) A relay processing apparatus according to entry 1, wherein the control request processor transmits the reception notification to the terminal request processor and is shifted to a halted state while maintaining an execution state; and wherein, when the HTTP server program receives another HTTP request that includes command process results for the command, the control request processor is recovered from the halted state and returns the processing control to the control program.

(Entry 5) A relay processing apparatus according to entry 1, wherein when the terminal request processor does not receive the reception notification from the control request processor within a predetermined period of time following the initiation of the process for the control program, the terminal request processor returns the processing control to the HTTP server program in order to transmit an HTTP response indicating that a failure occurred during the generation of the command.

(Entry 6) A relay processing apparatus according to entry 1, wherein, when, within a predetermined period of time following the transmission of the reception notification to the terminal request processor, the HTTP server program does not receive another HTTP request that includes the command process results for the command, the control request processor transmits, to the control program, information indicating that the command processing results have not been received.

(Entry 7) A relay processing apparatus according to entry 1, wherein, in correlation with the HTTP request, the HTTP server program receives terminal identification information for identifying the type of terminal that has transmitted the HTTP request; and wherein, based on the terminal identification information, the control request processor converts the command into a message form consonant with the terminal at a command transmission destination, so that the message can be transmitted to the terminal.

(Entry 8) A relay processing apparatus according to entry 1,
  wherein, when the HTTP server program has received, as a first HTTP request, a certification request message for requesting the preparation of an electronic certificate that authenticates the terminal, the terminal request processor receives a function call from the HTTP server program and initiates the process employed by the control program to prepare the electronic certificate;
  wherein, in accordance with a function call received from the control program, the control request processor receives a signature addition command to transmit to the terminal a certification request message to which an electronic signature has been added, and transmits the reception notification to the terminal request processor;
  wherein the terminal request processor returns the processing control to the HTTP server program, and permits the HTTP server program to transmit the signature addition command;
  wherein the terminal request processor receives a function call from the HTTP server program that has received, as a second HTTP request, a response to the signature addition command, and in order to operate the control program, forwards a notification to that effect to the control request processor;
  wherein, when the control request processor receives the certification request message to which the electronic signature has been added, which is the response to the signature addition command, the control request processor returns the processing control to the control program and transmits to the control program the certification request message to which the electronic signature has been added; and
  wherein the terminal request processor transmits, as the HTTP response to the third HTTP request, the electronic certificate that is prepared by an externally provided certificate authority in accordance with the certification request message to which the electronic signature has been added, which is received from the control program.

(Entry 9) A relay processing apparatus according to entry 1, further comprising:
  a command information storage unit for storing an HTTP request to be transmitted by the HTTP server program to the control request processor, and the command to be transmitted by the control request processor to the HTTP server program.

(Entry 10) A method for controlling a relay processing apparatus, for relaying communications between a process for a control program that generates control commands for a terminal and a process for an HTTP server program that returns, to the terminal, a command constituting an HTTP response to a HTTP request received from the terminal, comprising:
  a terminal request processing step of initiating the process performed by the control program upon the reception of a function call from the HTTP server program that initially received the HTTP request;
  a control request processing step of receiving from the control program a command corresponding to a function call, and for transmitting a notification that the command has been received; and
  a step of, when the reception notification is received, the processing is returned to the HTTP server program from the function call issued at the terminal request processing step, and of returning the command included in the HTTP response issued for the HTTP request.

(Entry 11) A program that employs a computer as a relay processing apparatus for relaying communications between a process for a control program that generates control commands for a terminal and a process for an HTTP server program that returns, to the terminal, a command constituting an HTTP response to a HTTP request received from the terminal, the computer functioning as:
  a terminal request processor for initiating the process performed by the control program upon the reception of a function call from the HTTP server program that initially received the HTTP request; and
  a control request processor for receiving from the control program a command corresponding to a function call, and for transmitting to the terminal request processor a notification that the command has been received,
  wherein, when the reception notification is received, the terminal request processor is permitted to return the processing to the HTTP server program, and the HTTP server program is permitted to return the command included in the HTTP response issued for the HTTP request.

(Entry 12) A recording medium on which a program according to entry 11 is stored.

(Entry 13) A terminal control server for controlling a terminal through a network, comprising:
  a terminal request processor for initiating a process for a control program that generates control commands for the terminal and a process for an HTTP server program that returns, to the terminal, a command constituting an HTTP response to a HTTP request received from the terminal, and for initiating a process for the control program upon the reception of a function call from the HTTP server program that initially received the HTTP request; and a control request processor for receiving from the control program a command corresponding to a function call, and for transmitting to the terminal request processor a notification that the command has been received, wherein, when the reception notification is received, the terminal request processor is permitted to return the processing to the HTTP server program, and the HTTP server program is permitted to return the command included in the HTTP response issued for the HTTP request.

As is apparent from the above description, according to the present invention, the reliability of the terminal control server that controls the terminal can be improved.

We claim:

1. A relay processing apparatus for relaying communications between a control program that generates control commands for a terminal and a process for an HTTP server program that returns to said terminal a command constituting an HTTP response to a HTTP request received from said terminal, comprising:
    a terminal request processor for initiating said control program upon the reception of a function call from said HTTP server program that initially received said HTTP request from the terminal; and
    a control request processor for receiving from said control program a first command generated as a response to the function call, and for transmitting to said terminal request processor a notification that said first command has been received, wherein the terminal request processor is configured to, responsive to the reception notification, return the first command to said HTTP server program, and the HTTP server program is configured to return said command to the terminal in said HTTP response issued for said HTTP request.

2. A relay processing apparatus according to claim 1 wherein the terminal is configured to transmit to the HTTP server program a second HTTP request that includes results from the first command, the control request processor is configured to transmit the results from the first command to the control program, and the control program is configured to perform a process corresponding to said results from the first command.

3. A relay processing apparatus according to claim 1, wherein said terminal request processor is configured to, responsive to the function call from said HTTP server program, shift said terminal request processor into a halted state while maintaining an execution state after transmitting the function call to the control program; and
    responsive to said reception notification from said control request processor, recover from said halted state and return processing control and the first command to said HTTP server program.

4. A relay processing apparatus according to claim 1, wherein said control request processor is configured to transmit said reception notification to said terminal request processor and shift into a halted state while maintaining an execution state; and
    responsive to a following second function call from the HTTP server program, recover from said halted state and return processing control to said control program.

5. A relay processing apparatus according to claim 1, wherein said terminal request processor is configured to, responsive to a non-receipt of said reception notification from said control request processor within a predetermined period of time, cause the HTTP server program to transmit an HTTP failure response to the terminal.

6. A relay processing apparatus according to claim 1, wherein the function call is a certification request message for requesting the preparation of an electronic certificate that authenticates said terminal and the terminal request processor receives the function call from said HTTP server program and initiates the process employed by said control program to prepare said electronic certificate;
    in accordance with a command received from said control program, said control request processor is configured to transmit a signature addition command to said terminal containing an electronic signature.

7. The apparatus of claim 6 wherein the terminal request processor is configured to receive a second function call containing a certification request message and an electronic signature from said HTTP server program as a response by the terminal to said signature addition command, and forward a notification to that effect to said control request processor;
    the control request processor is configured to, responsive to the notification of receipt of the second function call, transmit said certification request message to said control program; and
    said terminal request processor is configured to, transmit an electronic certificate received from said control program.

8. A method for controlling a relay processing apparatus, for relaying communications between a process for a control program that generates control commands for a terminal and a process for an HTTP server program that returns, to said terminal, a command constituting an HTTP response to a HTTP request received from said terminal, comprising:
    a terminal request processing step of initiating said process performed by said control program upon the reception of a function call from said HTTP server program that initially received said HTTP request;
    a control request processing step of receiving from said control program a command corresponding to a function call, and for transmitting a notification that said command has been received; and
    a step of, when said reception notification is received, the processing is returned to said HTTP server program from said function call issued at said terminal request processing step, and of returning said command included in said HTTP response issued for said HTTP request.

9. A terminal control server for controlling a terminal through a network, comprising:
    a terminal request processor for initiating a process for a control program that generates control commands for said terminal and a process for an HTTP server program that returns, to said terminal, a command constituting an HTTP response to a HTTP request received from said terminal, and for initiating a process for said control program upon the reception of a function call from said HTTP server program that initially received said HTTP request; and
    a control request processor for receiving from said control program a command corresponding to a function call, and for transmitting to said terminal request processor a notification that said command has been received, wherein, when said reception notification is received, said terminal request processor is permitted to return the processing to said HTTP server program, and said HTTP server program is permitted to return said command included in said HTTP response issued for said HTTP request.

* * * * *